(12) United States Patent
Brooks

(10) Patent No.: US 6,454,870 B1
(45) Date of Patent: Sep. 24, 2002

(54) CHEMICAL REMOVAL OF A CHROMIUM OXIDE COATING FROM AN ARTICLE

(75) Inventor: William Clarke Brooks, Lebanon, OH (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/994,343

(22) Filed: Nov. 26, 2001

(51) Int. Cl.[7] .................................................. C23G 1/02
(52) U.S. Cl. ...................... 134/3; 134/2; 134/19; 134/26; 134/28; 134/29; 134/30; 134/34; 134/35; 134/36; 134/41; 134/42; 510/201; 510/202; 510/245; 510/254; 510/435
(58) Field of Search ............................ 134/2, 3, 19, 26, 134/28, 29, 30, 34, 35, 36, 41, 42; 510/201, 202, 245, 254, 435

(56) References Cited

U.S. PATENT DOCUMENTS

| | | | |
|---|---|---|---|
| 3,085,917 A | * | 4/1963 | Netzler et al. ................ 134/27 |
| 3,458,353 A | | 7/1969 | Baldi ............................. 134/3 |
| 3,833,414 A | | 9/1974 | Grisik et al. ................... 134/3 |
| 4,328,044 A | | 5/1982 | Chasteen ........................ 134/2 |
| 4,655,383 A | * | 4/1987 | Fournes et al. ............. 228/119 |
| 4,944,807 A | | 7/1990 | Sova ............................... 134/3 |
| 5,112,572 A | * | 5/1992 | Eerkes et al. ................ 134/28 |
| 5,248,381 A | | 9/1993 | Dunker et al. .............. 156/637 |

* cited by examiner

Primary Examiner—Sharidan Carrillo
(74) Attorney, Agent, or Firm—David Narciso

(57) ABSTRACT

A chromium oxide coating is removed from a surface of an article by cleaning the article in an alkaline degreasing/rust removal solution at a degreasing/rust removal temperature of from about 180° F. to about 200° F., scale conditioning the article in an alkaline permanganate conditioning solution at a scale-conditioning temperature of from about 160° F. to about 200° F., and contacting the article to an acidic stripping solution comprising hydrochloric acid and an etching inhibitor at a stripping temperature of from about 130° F. to about 140° F.

15 Claims, 2 Drawing Sheets

CHEMICAL REMOVAL OF A CHROMIUM OXIDE COATING FROM AN ARTICLE

This invention relates to the removal of a chromium oxide coating from a surface of an article and, more particularly, to the removal of the chromium oxide coating from a nickel-base superalloy article that has been operated in a gas turbine engine.

BACKGROUND OF THE INVENTION

In an aircraft gas turbine (jet) engine, air is drawn into the front of the engine and compressed by an axial-flow compressor. The axial-flow compressor includes a number of compressor stages. Each compressor stage has a plurality of compressor blades mounted to a compressor disk, which in turn is mounted to a rotating shaft.

In many early versions of gas turbine engines, the compressor blades were made of an uncoated metal. As the technology of gas turbine engines has advanced and the temperatures of operation have increased, it has become necessary to coat the compressor blades to inhibit oxidation of the metal during extended service. The coatings need not be as protective and as resistant to the effects of the combustion gas at high temperatures as the environmental coatings and thermal barrier coatings used on the turbine blades, but they must provide oxidation protection at intermediate temperatures. Chromium oxide coatings cured in the presence of an inorganic binder have been selected for use to coat the compressor blades of the high-pressure compressor stages of some engines.

After the gas turbine engine has been operated in service for a period of time, it is typically disassembled for routine inspection. Inspections may also occur if problems are observed. In the inspection, the compressor blades are removed from the compressor disk. Some areas of the surfaces of the compressor blades are usually covered with contaminant materials such as dirt, oxide scale, and hydrocarbon residue, as well as the chromium oxide coating. To inspect the compressor blades properly, it is necessary to remove the contaminant material covering their surfaces. In one approach, the contaminant material may be removed with a mechanical technique such as grit blasting or glass bead blasting, but these mechanical techniques may compromise the subsequent inspection or harm the base metal of the compressor blade.

At the present time there is no chemical method for removing the surface material found on nickel-base superalloy compressor blades that are initially covered with the chromium oxide coating and then operated in service, and there is need for such a technique. The present invention fulfills this need, and further provides related advantages.

SUMMARY OF THE INVENTION

The present invention provides a technique for removing a chromium oxide coating from an article. Overlying contaminant materials resulting from exposure to a gas turbine environment, such as dirt, oxide scale, and hydrocarbon residue, are also removed. The present approach is based primarily on chemical cleaning, without the use of grit or bead blasting. It is therefore relatively gentle on the underlying base metal of the article being cleaned, and reaches areas not accessible by line-of-sight techniques. It is suitable for mass production processing.

A method of removing a coating from a surface, such as the surface of a compressor blade, comprises the steps of providing an article having the coating comprising chromium oxide thereon, cleaning the article in an alkaline degreasing/rust removal solution at a degreasing/rust removal temperature, preferably from about 180° F. to about 200° F., scale conditioning the article in an alkaline permanganate conditioning solution at a scale-conditioning temperature, preferably from about 160° F. to about 200° F., and contacting the article to an acidic stripping solution comprising hydrochloric acid and an etching inhibitor at a stripping temperature, preferably from about 130° F. to about 140° F. Preferably, the article is washed in water after each of these steps, and optionally gently brushed to remove loose material from the surface.

The method may include an additional step, after the step of contacting, of rinsing the article and brushing the article to remove any loose material thereon. If the described procedure is not sufficient to remove all of the chromium oxide coating, it may include additional steps, after the step of rinsing, of second contacting the article to the acidic stripping solution at the stripping temperature, and second rinsing the article and second brushing the article.

The present approach may be applied to a wide variety of articles. Desirably, the article is a superalloy article having the coating thereon, and most preferably it is a superalloy article such as a compressor blade that has been operated in a gas turbine engine.

The alkaline degreasing/rust removal solution preferably comprises sodium hydroxide with a pH of greater than about 14. The alkaline permanganate conditioning solution preferably comprises permanganate in a concentration of at least about 25 percent by weight and has a pH of greater than about 14. The acidic stripping solution preferably comprises hydrochloric acid in a concentration of from about 85 to about 135 grams per liter. The inhibitor preferably comprises acetic acid, isopropyl alcohol, hexamethylenetetramine, and propargyl alcohol in a concentration of about 0.3 percent by volume of the acidic stripping solution.

The present approach removes the contaminant material, if any, and the chromium oxide from the surface of the article. It does not mechanically alter the surface of the article, so that subsequent inspections of the article are not impeded. The only mechanical processing of the surface is an optional gentle brushing.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
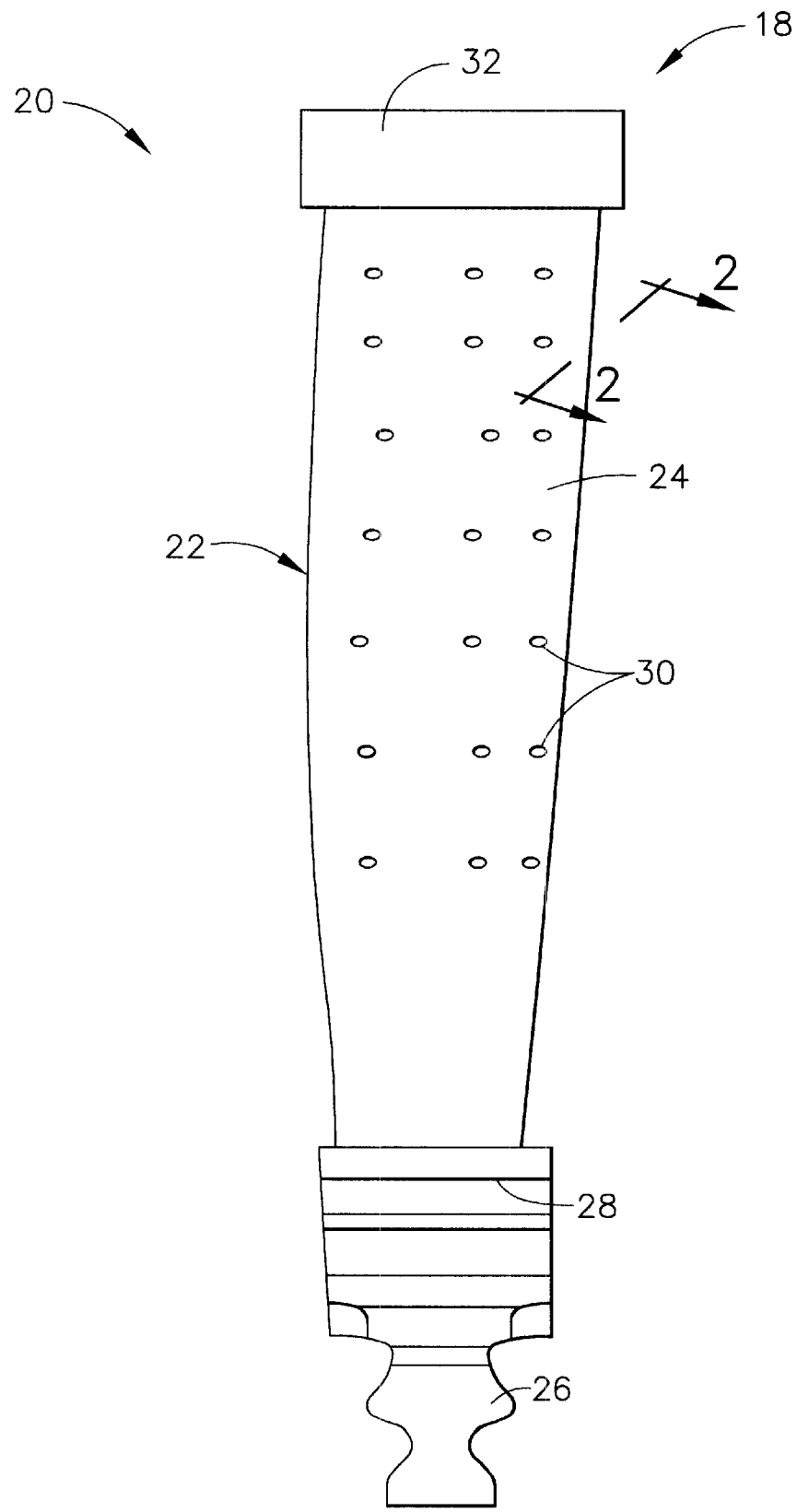
FIG. 1 is an elevational view of a compressor blade.

FIG. 1 depicts an article 18 such as a gas turbine component 20, and in this case a compressor blade 22. The compressor blade 32 is formed of any operable material but is preferably a superalloy such as a nickel-base superalloy. A nickel-base alloy is one that has more nickel than any other element. A nickel-base superalloy is a nickel-base alloy that is strengthened by the precipitation of gamma prime or a related phase. Most preferably, the nickel-base superalloy has more than about 14 percent by weight chromium, to minimize the likelihood that the present processing attacks the base metal of the article.

The compressor blade 22 includes an airfoil 24 against which the flow of hot exhaust gas is directed. The compressor blade 22 is mounted to a compressor disk (not shown) by a root 26 which extends downwardly from the airfoil 24 and engages a slot on the compressor disk. A platform 28 extends transversely outwardly from the area where the airfoil 24 is joined to the root 26. Optionally, a number of internal passages extend through the interior of the airfoil 24, ending in openings 30 in the surface of the airfoil 24. During service, a flow of cooling air is directed through the internal passages and out the openings 30 to reduce the temperature of the airfoil 24. A rotating shroud 32 is at the tip of the airfoil 24 remote from the root 26.

Figure 2:
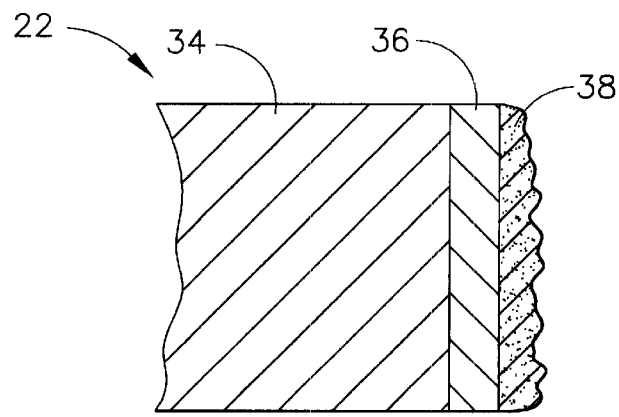
FIG. 2 is an enlarged schematic sectional view through the compressor blade of FIG. 1, taken on line 2—2.

FIG. 2 is a sectional view through the compressor blade 22. The base metal of the compressor blade 22 forms a substrate 34 upon whose surface a chromium oxide coating 36 is deposited during the manufacture or prior refurbishing of the compressor blade 22. After the compressor blade 22 has been operated in service in the gas turbine engine, there is typically developed a contaminant-material layer 38 of substances such as dirt, oxide scale (i.e., other than the chromium oxide), and hydrocarbon residue. This contaminant-material layer 38 is baked onto the surface of the substrate 34 and its chromium oxide coating 36 by the moderately temperatures to which the compressor blade 22 is exposed during service.

Figure 3:
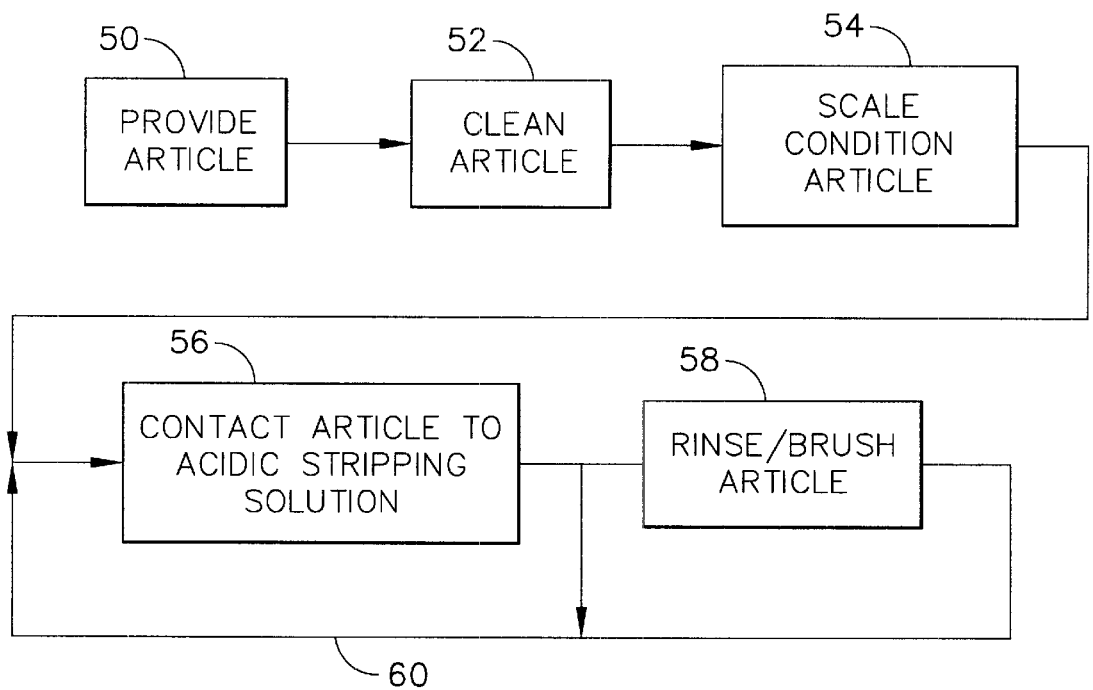
FIG. 3 is a block diagram of a method for processing the compressor blade to remove the chromium oxide coating.

When the compressor blade 22 is to be inspected after its service in the gas turbine engine, the chromium oxide coating 36 and the contaminant-material layer 38 must first be removed. FIG. 3 depicts this removal process. The article 18 such as that illustrated in FIGS. 1 and 2 is provided, numeral 50.

The article 18 is cleaned, numeral 52, by immersion in an alkaline degreasing/rust removal solution at a degreasing/rust removal temperature, preferably from about 180° F. to about 200° F. The alkaline degreasing/rust removal solution preferably comprises sodium hydroxide with a pH of greater than about 14. Optionally, sodium gluconate and a wetting agent may be added to the alkaline degreasing/rust removal solution. The contact time of the article 18 and the alkaline degreasing/rust removal solution is preferably from about 15 to about 45 minutes, and most preferably is about 30 minutes. The article 18 is removed from the alkaline degreasing/rust removal solution, and rinsed by spraying with a water jet or immersion in water at room temperature.

The article 18 is thereafter scale conditioned, numeral 54, by immersion in an alkaline permanganate conditioning solution at a scale-conditioning temperature, preferably from about 160° F. to about 200° F. The alkaline permanganate conditioning solution comprises a permanganate such as potassium permanganate or sodium permanganate in a concentration of at least about 25 percent by weight and has a pH of greater than about 14, produced by the addition of a hydroxide such as potassium hydroxide or sodium hydroxide. The contact time of the article 18 and the alkaline permanganate conditioning solution is preferably from about 45 to about 75 minutes, and most preferably is about 60 minutes. The article 18 is removed from the alkaline permanganate conditioning solution, and rinsed by spraying with a water jet or immersion in water at room temperature. After the scale conditioning, the chromium oxide coating 36 is grayish-green in color.

The preceding steps remove the contamination layer 38, exposing the chromium oxide coating 36.

The article is thereafter contacted to an acidic stripping solution, numeral 56, comprising hydrochloric acid and an etching inhibitor at a stripping temperature, preferably from about 130° F. to about 140° F. The contact time of the article 18 and the acidic stripping solution is preferably from about 15 to about 45 minutes, and most preferably is about 30 minutes. The acidic stripping solution comprises hydrochloric acid, preferably in a concentration of from about 85 to about 135 grams per liter, most preferably about 110 grams per liter. The acidic stripping solution further comprises the inhibitor that inhibits the etching attack of the stripping solution on the base metal of the substrate as it becomes exposed during step 56. The preferred inhibitor contains an organic inhibitor. A most-preferred inhibitor is a solution of acetic acid, isopropyl alcohol, hexamethylenetetramine, and propargyl alcohol in a concentration of from about 0.2 to about 0.4 percent by volume, most preferably about 0.3 percent by volume. This inhibitor is available from Henkel corporation, Madison Heights, Mich., as Rodine$^R$ XL-1090. A preferred composition of the inhibitor is about 1–10 parts by weight of acetic acid, about 1–10 parts by weight of isopropyl alcohol, about 10–30 parts by weight of hexamethylenetetramine, and about 1–10 parts by weight of propargyl alcohol. After the acid treatment, the chromium oxide coating 36 is grayish in color.

The article 18 is removed from the acidic stripping solution, and rinsed by spraying with a water jet or immersion in water, numeral 58. The water rinsing 58 may be accomplished with a water jet or by immersion in water at room temperature. If loose residue is observed on the surface of the article, the rinsing may be accomplished instead or additionally in deionized water at a minimum temperature of 160° F. Loose residue on the surface may be removed by brushing the surface of the article 18 with a nonmetallic, soft-bristle brush or a nonmetallic pad such as a Scotch Brite pad. This light brushing of the surface is the only mechanical cleaning used in the present approach.

The surface of the article 18 is thereafter examined visually. If traces of the chromium oxide coating 36 remain, the steps 56 and 58 may be repeated, numeral 60, until none of the chromium oxide coating 36 is observed.

The present invention has been practiced on compressor blades 22 that have been removed from a gas turbine engine after service. The base metal of the substrate 34 was Udimet 720. The preferred three-step approach described above was used, and the contamination layer 38 and the chromium oxide coating 36 were completely removed.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of removing a chromium oxide coating from a superalloy article, comprising the steps of providing a superalloy article that has been previously operated in a gas turbine engine and having the coating thereon, the coating comprising chromium oxide;

cleaning the article in an alkaline hydroxide degreasing/rust removal solution at a degreasing/rust removal temperature of from about 180° F. to about 200° F.;

scale conditioning the article in an alkaline permanganate conditioning solution at a scale conditioning temperature of from about 160° F. to about 200° F; and contacting the article to an acidic stripping solution comprising hydrochloric acid and an etching inhibitor at a stripping temperature of from about 130° F. to about 140° F., to remove the chromium oxide coating from the superalloy article.

2. The method of claim 1, wherein the step of providing the article includes the step of providing a compressor blade having the coating thereon.

3. The method of claim 1, including an additional step, after the step of contacting, of rinsing the article and brushing the article to remove any loose chromium oxide coating present on the superalloy article.

4. The method of claim 1, wherein the alkaline hydroxide degreasing/rust removal solution comprises sodium hydroxide with a pH of greater than about 14.

5. The method of claim 1, wherein the alkaline permanganate conditioning solution comprises permanganate in a concentration of at least about 25 percent by weight and has a pH of greater than about 14.

6. The method of claim 1, wherein the acidic stripping solution comprises hydrochloric acid in a concentration of from about 85 to about 135 grams per liter.

7. The method of claim 1, wherein the etching inhibitor comprises acetic acid, isopropyl alcohol, hexamethylenetetramine, and propargyl alcohol in a concentration of about 0.3 percent by volume.

8. The method of claim 1, wherein the etching inhibitor comprises an organic etching inhibitor.

9. The method of claim 3, including additional steps, after the step of rinsing, of repeating the step of contacting the article to the acidic stripping solution comprising hydrochloric acid and the etching inhibitor at the stripping temperature, and repeating the step of rinsing and brushing the article.

10. A method of removing a chromium oxide coating from a nickel-base superalloy article, comprising the steps of providing a nickel-base superalloy article that has been previously operated in a gas turbine engine and has the chromium oxide coating thereon;

cleaning the article in an aqueous alkaline degreasing/rust removal solution comprising sodium hydroxide with a pH of greater than about 14 and at a degreasing/rust removal temperature of from about 180° F. To about 200° F.;

scale conditioning the article in an alkaline permanganate conditioning solution, wherein the alkaline permanganate conditioning solution comprises permanganate in a concentration of at least about 25 percent by weight and has a pH of greater than about 14, at a scale-conditioning temperature of from about 160° F. to about 200° F.; and contacting the article to an acidic stripping solution comprising hydrochloric acid, in a concentration of from about 85 to about 135 grams per liter, and an organic etching inhibitor at a stripping temperature of from about 130° F. to about 140° F., to remove the chromium oxide coating from the nickel-base superalloy article.

11. The method of claim 10, including an additional step, after the step of contacting, of rinsing the article and brushing the article to remove any loose chromium oxide coating present on the nickel-base superalloy article.

12. The method of claim 10, wherein the etching inhibitor comprises acetic acid, isopropyl alcohol, hexamethylenetetramine, and propargyl alcohol in a concentration of about 0.3 percent by volume.

13. The method of claim 10, wherein the step of providing the article includes the step of providing a compressor blade having the coating thereon.

14. The method of claim 10, wherein the etching inhibitor comprises an organic etching inhibitor.

15. The method of claim 11, including additional steps, after the step of rinsing, of repeating the step of contacting the article to the acidic stripping solution comprising hydrochloric acid and the etching inhibitor at the stripping temperature, and repeating the step of rinsing and brushing the article.

* * * * *